United States Patent
Buss

(10) Patent No.: US 6,352,281 B1
(45) Date of Patent: Mar. 5, 2002

(54) CARPET-INTEGRATED FOOT CUSHION CONFIGURED AS A PASSIVE RESTRAINT COMPONENT IN A VEHICLE

(75) Inventor: Winifried Buss, Limburg (DE)

(73) Assignee: Siemens Restraint Systems GmbH, Alzenau (DE)

( * ) Notice: Subject to any disclaimer, the term of this patent is extended or adjusted under 35 U.S.C. 154(b) by 0 days.

(21) Appl. No.: 09/581,783

(22) PCT Filed: Dec. 14, 1998

(86) PCT No.: PCT/EP98/08181

§ 371 Date: Jul. 31, 2000

§ 102(e) Date: Jul. 31, 2000

(87) PCT Pub. No.: WO99/30931

PCT Pub. Date: Jun. 24, 1999

(30) Foreign Application Priority Data

Dec. 18, 1997 (DE) .......................................... 197 56 430

(51) Int. Cl.⁷ .............................................. B60R 21/22
(52) U.S. Cl. ..................................... 280/730.1; 280/748
(58) Field of Search ............................ 280/730.1, 748, 280/751, 735, 743.1, 728.1

(56) References Cited

U.S. PATENT DOCUMENTS

| 2,943,866 A | * | 7/1960 | Witter ......................... 280/748 |
| 3,591,232 A | * | 7/1971 | Simon ...................... 297/216.1 |
| 4,154,472 A | * | 5/1979 | Bryll .......................... 296/68.1 |
| 4,225,178 A | * | 9/1980 | Takada ..................... 297/216.1 |
| 4,948,168 A | * | 8/1990 | Adomeit et al. ............. 280/732 |
| 5,312,131 A | * | 5/1994 | Kitagawa et al. ........ 280/730.2 |
| 5,340,185 A | * | 8/1994 | Vollmer ...................... 296/68.1 |
| 5,458,366 A | * | 10/1995 | Hock et al. .................. 280/729 |
| 5,695,242 A | * | 12/1997 | Brantman et al. ........ 297/216.1 |
| 6,158,766 A | * | 12/2000 | Kowalski .................. 280/730.1 |
| 6,213,505 B1 | * | 4/2001 | Van Wynsberghe et al. ..... 280/748 |
| 6,217,059 B1 | * | 4/2001 | Brown et al. ............. 280/730.2 |

FOREIGN PATENT DOCUMENTS

| DE | 4302891 A1 | 8/1993 |
| DE | 29517953 U1 | 2/1996 |

* cited by examiner

Primary Examiner—Paul N. Dickson
Assistant Examiner—Deanna Draper
(74) Attorney, Agent, or Firm—Volpe and Koenig, P.C.

(57) ABSTRACT

The invention relates to a device for reducing the danger of injury to the foot and leg areas of a person sitting on a seat arranged inside a vehicle in the case of an accident related deformation of the footwell. The footwell is lined with a floor covering (19) which is made of an acoustic dampening layer (22) and a carpet (23) which is laid thereon. The device compromises a foot cushion (24) assigned to the footwell. At least one gas generator (20) assigned to the foot cushion suddenly feeds gas into said cushion upon a triggering signal, whereby the foot cushion (24) momentarily fills out the relevant footwell with given dimensions before the front wall intrudes into the vehicle passenger compartment. According to the invention, the foot cushion (24) is constructed between the acoustic dampening layer (22) and the carpet (23) of the floor covering (19), whereby the gas is guided from the gas generator (10) and into the space between the acoustic dampening layer (22) and the carpet (23). The carpet (23) is fastened in only an area-like manner to the acoustic dampening layer (22) in the area of the constructed foot cushion (24).

6 Claims, 2 Drawing Sheets

CARPET-INTEGRATED FOOT CUSHION CONFIGURED AS A PASSIVE RESTRAINT COMPONENT IN A VEHICLE

BACKGROUND

The present invention concerns a carpet-integrated foot cushion serving as a passive restraint component in a vehicle and as a device for reducing the danger of injury in the foot and leg areas of a person sitting on a seat positioned in the interior of a vehicle in case of accident-related deformation of the footwell according to German patent 196 39 467.

According to this patent, the footwell is provided in two embodiments with a gas bag of an associated air-bag module into which gas from a gas generator is introduced in a sudden burst as a result of a trigger signal, whereupon the gas bag quickly fills up the footwell in question to the specified degree in order to form a dampening cushion for the foot area before the dashboard intrudes into the interior of the vehicle.

It is proposed according to the principal patent, that it is necessary to position and suitably secure a discrete gas bag in the footwell in question. This involves increased effort and higher costs.

On the other hand, vehicles of newer design possess in the footwell a floor covering which, compared to previous floor coverings, is enhanced at least to include sound-absorbing features. In particular, modern floor coverings exhibit a sound-absorbing layer which is covered by the actual carpet layer.

SUMMARY

From this background, it is the object of the present invention to further develop the device of the above-mentioned type in order to be able to realize the arrangement of a dampening foot cushion as economically as possible.

This problem is solved through the device described in the first claim. Additional advantageous embodiments result from the subclaims.

As already mentioned, an assumption for the inventive further development of the device of the above-mentioned type is that the footwell be lined with a floor covering consisting of a sound-absorbing layer and a superimposed carpet.

According to the present invention, the foot cushion in the footwell is formned between the sound-absorbing, layer and the carpet of the floor covering, the gas from the gas generator being directed into the space between the sound-absorbing layer and the carpet and the carpet being secured only at certain points to the sound-absorbing layer in the area of the developing foot cushion.

Thus, in the present case, a discrete gas bag is no longer used; rather, the multilayered nature of modern floor coverings is utilized in rapidly forming a foot cushion between the floor-covering layers. The multilayered nature of modern floor coverings therefore permits forgoing integration of a conventional gas bag. Assuming modification of the production process, the solution according to the present invention even makes it possible to integrate the inflatable foot cushion into the production process from the very beginning. Thus, the cost of the foot cushion can be held extremely low, which can lead to broad acceptance on the market.

The permeability of the foot cushion makes possible a so-called venting, which permits the escape of the gas from the foot cushion following inflation. This results from the gas permeability of the sound-absorbing layer and the carpet, i.e., of the entire floor covering.

According to an advantageous further development, in the area of the foot cushion forming in case of an accident, the carpet is secured to the sound-absorbing layer only at predetermined tear or break points. With a nonactivated gas generator, the securing of the carpet at the said tear or break points avoids the formation of folds in the carpet. On the other hand, these tear or break points permit sudden inflation of the foot cushion to full size within a few milliseconds following activation of the gas generator. The securing of the carpet to the sound-absorbing layer is eliminated as a result of the fact that the underside of the carpet tears away from the points of attachment. A predictable formation of the foot cushion is thus guaranteed.

According to an advantageous embodiment, the gas generator directing the gas into the foot cushion is a two-stage gas generator. To this generator can be attached, for example, two separate pressure lines, one of which directs gas into the foot cushion of the present invention. The other pressure line could advantageously be connected, for example, with a frontal air bag. Upon triggering of the two-stage gas generator, both the foot cushion as well as the frontal air bag would thus be inflated. As a result, equipment needs (such as, e.g., several generators) are reduced to a minimum. The chronological sequence (e.g., how many milliseconds the foot cushion is to be inflated before the frontal air bag) can also be controlled in such a system.

Alternatively, it can be provided that the gas generator is a single-stage gas generator to which, however, several pressure lines are attached, the ratio of their flow diameters decisively influencing the chronological inflation behavior of the attached gas bag and foot cushion.

Naturally, it is also possible to provide a separate gas generator for the foot cushion, which can be activated separately from, for example, the frontal air bag.

BRIEF DESCRIPTION OF THE DRAWING

The present invention is illustrated in more detail on the basis of a preferred embodiment.

In connection with this.

DETAILED DESCRIPTION OF THE PREFERRED EMBODIMENTS

Figure 1:
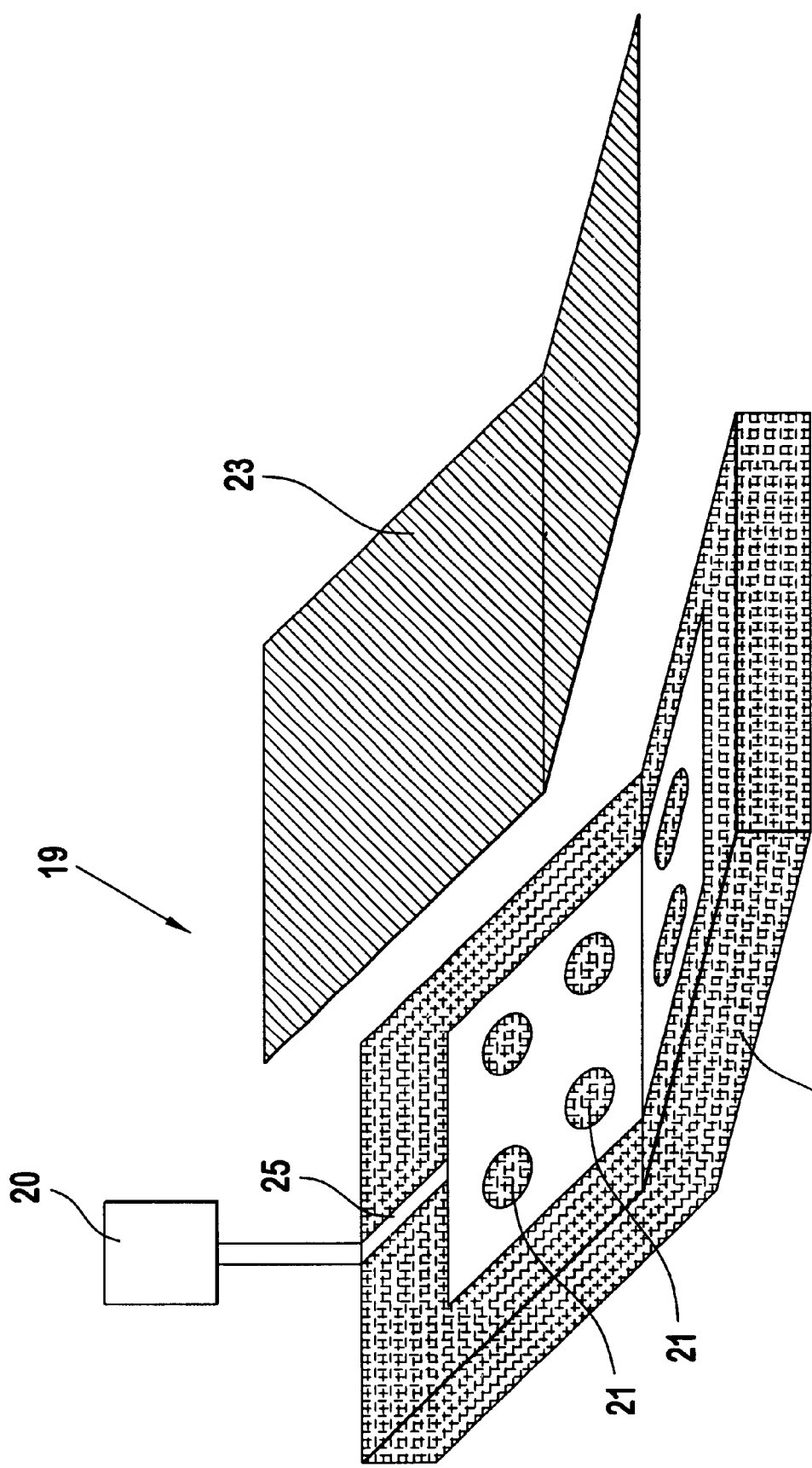
FIG. 1 shows the schematic design of the device.

FIG. 1 clearly shows the schematic design of the device. The floor covering 19 in the footwell of the vehicle today consists of a sound-absorbing layer 22 onto which is applied a carpet layer 23.

The areas of the sound-absorbing layer 22 which are tightly joined to the carpet 23 are represented via hatching. Those points of layer 22 to which the carpet 23 is not secured are shown as clear. One recognizes that there are provided in the clear areas some tear or break points 21 to which the carpet 23 is attached in the rest state of the system. This keeps the carpet 23 from forming folds in the rest state of the system.

A gas pressure line 25 connected with a gas generator 20 is guided through layer 22.

The mode of operation is described with reference to FIGS. 2 and 3.

Figure 2:
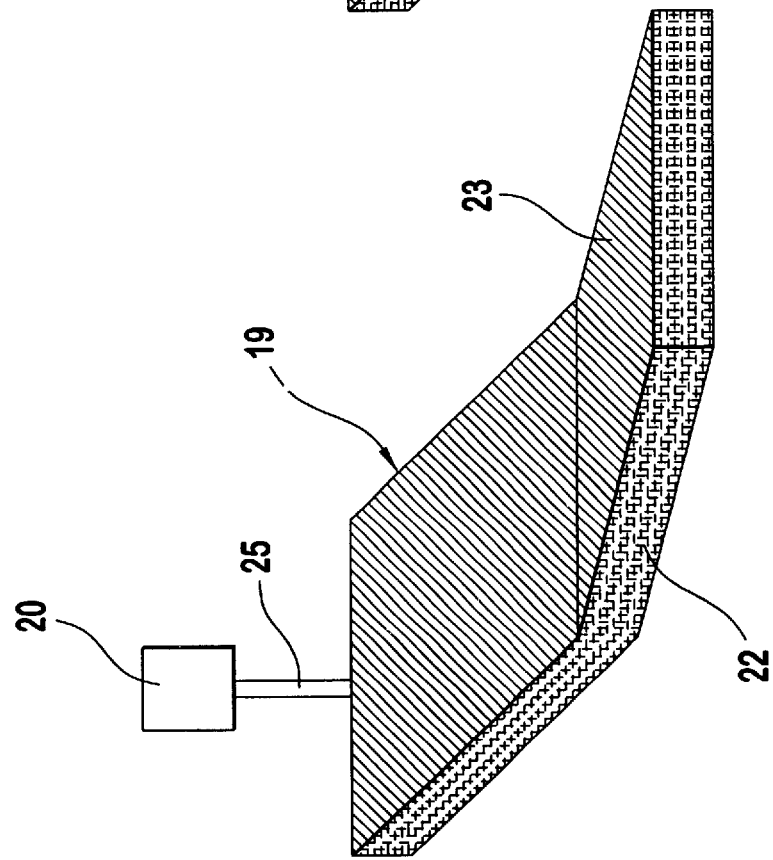
FIG. 2, the device in the rest state.

FIG. 2 shows the system in the rest state, in which the floor covering 19 is made up of the sound-absorbing layer 22 and the carpet 23 positioned thereon, preferably secured as described on the basis of FIG. 1. The gas generator 20 is in the rest state.

Figure 3:
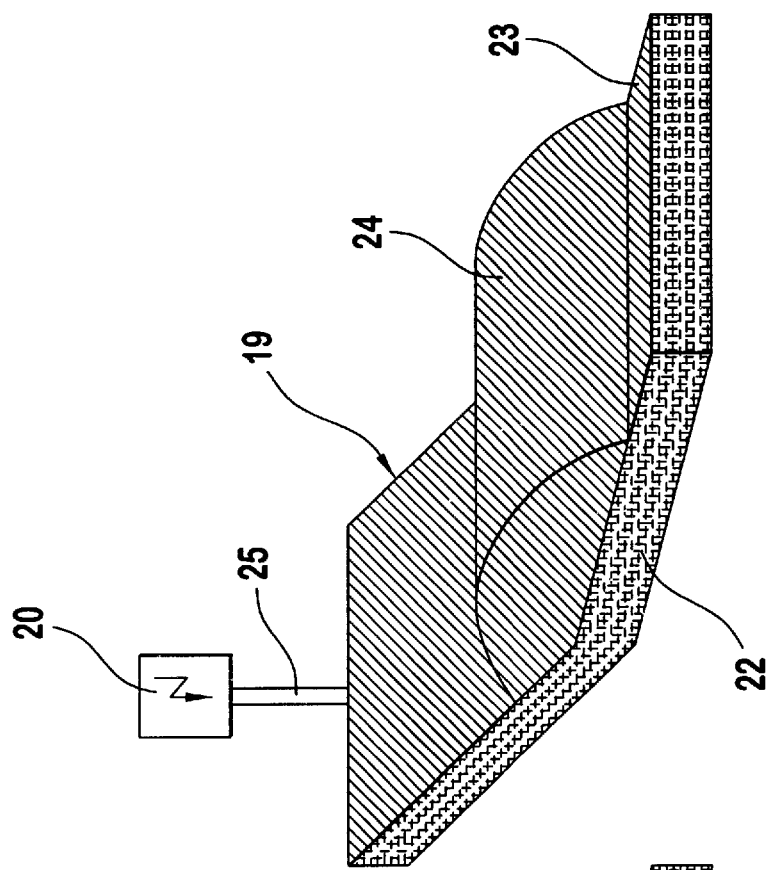
FIG. 3, the device directly after firing of the gas generator.

If a triggering signal occurs, the gas generator 20 is fired, as indicated in FIG. 3. Gas is then directed in a sudden burst via the pressure line 25 into the prepared foot cushion 24, which leads to a bulging of the carpet 23 on layer 22. Thus, the foot cushion is not realized in the present invention via a separate, discrete gas bag, but rather through introduction of the gas from the gas generator 20 between layers 22 and 23 of the floor covering 19 normally present anyway in the vehicle. Following inflation of foot cushion 24, the gas escapes through the gas-permeable floor covering 19 so that foot cushion 24 can exercise its dampening function.

As already mentioned at the beginning, the triggering times of air bags in modern vehicles are so early that a combined triggering for the foot cushion and a frontal air bag would be possible.

What is claimed is:

1. Device for reducing the danger of injury to the foot and leg areas of a person sitting in a seat positioned in an interior of a vehicle in case of accident-related deformation of a footwell lined with a floor covering (19) including a sound-absorbing layer (22) and a carpet (23) lying thereon, the device comprising a footwell-arranged foot cushion (24) into which at least one associated gas generator (20) introduces gas in a sudden burst following a triggering signal, whereupon the foot cushion (24) quickly fills the footwell to a specified degree, the foot cushion (24) being formed by the sound-absorbing layer (22) and the carpet (23) of the floor covering (19), the gas from the gas generator (20) being directed into a space between the sound-absorbing layer (22) and the carpet (23), and the carpet (23) being attached to the sound-absorbing layer (22) at specified zones in an area of the developing foot cushion.

2. Device according to claim 1, in which, in the area of the foot cushion (24) developing as a result of an accident, the carpet (23) is attached at predetermined tear/break points (21) to the sound-absorbing layer (22) of the floor covering (19).

3. Device according to claim 2, in which the gas generator (20) is a two-stage gas generator.

4. Device according to claim 2, in which the gas generator (20) is a single-stage gas generator to which several pressure lines are attached.

5. Device according to claim 1, in which the gas geneartor (20) is a two-stage gas generator.

6. Device according to claim 1, in which the gas generator (20) is a single-stage gas generator to which several pressure lines are attached.

* * * * *